(12) United States Patent
Hinchey et al.

(10) Patent No.: US 8,275,724 B2
(45) Date of Patent: Sep. 25, 2012

(54) METHOD OF IMPROVING SYSTEM PERFORMANCE AND SURVIVABILITY THROUGH CHANGING FUNCTION

(75) Inventors: Michael G. Hinchey, Bowie, MD (US); Emil I. Vassev, Montreal (CA)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 393 days.

(21) Appl. No.: 12/569,422

(22) Filed: Sep. 29, 2009

(65) Prior Publication Data

US 2010/0146635 A1    Jun. 10, 2010

Related U.S. Application Data

(60) Provisional application No. 61/105,474, filed on Oct. 15, 2008.

(51) Int. Cl.
*G06F 15/18* (2006.01)

(52) U.S. Cl. .................................................. 706/14
(58) Field of Classification Search .................. None
See application file for complete search history.

(56) References Cited

U.S. PATENT DOCUMENTS

2006/0122952 A1* 6/2006 Hinchey et al. ............ 706/13
2010/0036556 A1* 2/2010 Na et al. .................... 701/26

OTHER PUBLICATIONS

Asteroid Exploration with Autonomic Systems, James Walt, 2004 IEEE, pp. 1-6.*

* cited by examiner

*Primary Examiner* — Omar Fernandez Rivas
*Assistant Examiner* — Luis Sitiriche (57) ABSTRACT

A biologically-inspired system and method is provided for self-adapting behavior of swarm-based exploration missions, whereby individual components, for example, spacecraft, in the system can sacrifice themselves for the greater good of the entire system. The swarm-based system can exhibit emergent self-adapting behavior. Each component can be configured to exhibit self-sacrifice behavior based on Autonomic System Specification Language (ASSL).

20 Claims, 4 Drawing Sheets

FIG.1

I. Autonomic System (AS)
- AS Service-Level Objectives
- AS Self-Management Policies
- AS Architecture
- AS Actions
- AS Events
- AS Metrics II. AS Interaction Protocol (ASIP)
- AS Messages & Negotiation Protocol
- AS Communication Channels
- AS Communication Functions III. Autonomic Element (AE)
- AE Service-Level Objectives
- AE Self-Management Policies
- AE Friends
- AE Interaction Protocol (AEIP)
    - AE Messages & Negotiation Protocol
    - AE Communication Channels
    - AE Communication Functions
    - AE Managed Resource Interface
- AE Recovery Protocols
- AE Behavior Models
- AE Outcomes
- AE Actions
- AE Events
- AE Metrics

FIG. 2

```
1.   AECLASS Worker {
2.    AESELF_MANAGEMENT {
3.     OTHER_POLICIES {
4.      SELF_SACRIFICE {
5.       FLUENT unableToExplore {
6.         INITIATED_BY {EVENTS.instrisNonfunctional }
7.          TERMINATED_BY {EVENTS.canBeRuler , EVENTS.canBeMessenger,
8.            EVENTS.canBeShield , EVENTS.mustBeDestroyed }
9.       }
10.      FLUENT inTransformToRuler {
11.         INITIATED_BY { EVENTS.canBeRuler }
12.         TERMINATED_BY { EVENTS.transformedToRuler ,
13.            EVENTS.canBeMessenger , EVENTS.canBeShield }
14.      }
15.      FLUENT inTransformToMessenger {
16.          INTIATED_BY { EVENTS.canBeMessenger }
17.          TERMINATED_BY { EVENTS.transformedToMessenger,
18.             EVENTS.canBeRuler , EVENTS.canBeShield }
19.      }
20.      FLUENT inTransformToShield {
21.          INITIATED_BY { EVENTS.canBeShield , EVENTS.transformedToShield }
22.          TERMINATED_BY { EVENTS.mustBeDestroyed }
23.      }
24.      FLUENT inSelfDestruction {
25.          INITIATED_BY { EVENTS.mustBeDestroyed }
26.      }
27.      MAPPING {
28.         · CONDITIONS { instrisNonfunctional }
29.           DO_ACTIONS { ACTIONS.checkTransformation } }
30.      MAPPING {
31.          CONDITIONS { inTransformToRuler }
32.          DO_ACTIONS { ACTIONS.transformToRuler } }
33.      MAPPING {
34.          CONDITIONS { inTranformToMessenger }
35.          DO_ACTIONS { ACTIONS.transformToMessenger } }
36.      MAPPING {
37.          CONDITIONS { inTransformToShield }
38.          DO_ACTIONS { ACTIONS.transformToShield } }
39.      MAPPING {
40.          CONDITIONS { inSelfDestruction }
41.          DO_ACTIONS { ACTIONS.selfDestroy } }
42.     }
43.    }
44.   }//AESELF_MANAGEMENT
       ....
45.   ACTIONS { .... }
46.   EVENTS { .... }
47.   METRICS {
48.       METRIC movingAbility { .... }
49.       METRIC antennaAvailability { .... }
          ....
50.   }
51. }
```

FIG. 3

```
1.  ACTIONS {
2.      ACTION transformToShield {
3.          ENSURES { METRICS.Moving.Ability.VALUE > 0 }
4.          DOES {
5.              remove AESLO { };
6.              add AESLO { SLO shieldWorkers {....} };
7.              change AESELF_MANAGEMENT.SELF_HEALING { SWITCH {OFF} };
8.              change AESELF_MANAGEMENT.SELF_PROTECTING { SWITCH {OFF} };
9.              change AESELF_MANAGEMENT.SELF_ADAPTING { SWITCH {OFF};
10.             change AESELF_MANAGEMENT.SELF_OPTIMIZING { SWITCH {OFF} };
11.     // produce the necessary shield actions and events that prompt these actions
12.             add EVENTS { EVENT timeToShield {....} };
13.             add ACTIONS { ACTION shieldAction {....} };
14.             call IMPL doShieldTransformation
15.         }
16.         TRIGGERS { EVENTS.transformedToShield }
17.         ONERR_TRIGGERS { EVENTS.mustBeDestroyed }
18.     }
19.     ACTION transformToRuler { ....
20.         DOES {
21.             call IMPL saveAESPEC;
22.             call ASIP.FUNCTIONS.sendRulerSpecRequest;
23.             call ASIP.FUNCTIONS.receiveRulerSpecification;
24.     //remove the old spec structures
25.             remove AESLO { };
26.             remove AESELF_MANAGEMENT { };
                ....
27.     //produce the new spec structures based on the received spec
28.             add AESLO {.... };
29.             and AESELF_MANAGEMENT { SELF_HEALING {....} };
                ....
30.             call IMPL doRulerTransformation
31.         }
32.         ONERR_DOES { call IMPL restoreAESPEC }
33.         TRIGGERS { EVENTS.transformedToRuler }
34.         ONERR_TRIGGERS {
35.             IF METRICS.antennaAvailability.VALUE > 80 THEN
36.                 EVENTS.canBeMessenger
37.             END ELSE
38.                 EVENTS.canBeShield
39.             END
40.         }
41.     }
        ....
42. }
```

FIG. 4

METHOD OF IMPROVING SYSTEM PERFORMANCE AND SURVIVABILITY THROUGH CHANGING FUNCTION

CROSS-REFERENCE TO RELATED APPLICATION

The present application claims a benefit from prior U.S. Patent Application No. 61/105,474, filed Oct. 15, 2008, which is incorporated herein in its entirety by reference.

STATEMENT OF GOVERNMENT INTEREST

The invention described herein was at least in-part made by an employee of the United States Government and may be manufactured and used by or for the Government of the United States of America for governmental purposes without the payment of any royalties thereon or therefor.

FIELD

The present invention relates generally to the field of artificial intelligence and to architecture for collective interactions between autonomous entities.

BACKGROUND

The common goals of much contemporary software development are related to quality, flexibility, and security, which imply an inherent need for self-management and self-monitoring. There are many examples of emergent behavior in the insect world. For example, when it gets cold, the worker bees gather around the queen bee to warm her with the heat of their bodies, resulting in some of them freezing to death. In another example, bee stingers are a relatively strong defense mechanism for protecting a hive, but whenever a bee stings, it dies. In yet another example, the soldier termites defend the colony by blocking the tunnels with their body. Usually more soldiers stand by behind the initial soldier so once the first one falls, another soldier will take his place. In the case that the intrusion is coming from a large breach that cannot be blocked by a single soldier, more solder termites form a phalanx-like formation that blocks the entire breach, until the latter is repaired by other termites.

In human beings, the self-destruction behavior of human body cells is considered as an intrinsic safety mechanism of the human body. It seems that the lifetime of a cell is programmed and that cells know when to commit suicide. This self-destruction is an intrinsic property that can be delayed due to the continuous receipt of biochemical reprieves. This process, also known as "death by default", or apoptosis, prevents cells from dying due to constant receipt of biochemical "stay alive" reprieve signals. Investigations into the apoptosis process have discovered that whenever a cell divides, it commits suicide due to lack of reprieve signals. It is believed that the reason for this is self-protection, as the most dangerous time for the body is when a cell divides, since if just one of the billions of cells locks into division the result is a tumor.

Moreover, metamorphosis and transformation processes are observable in different species. Metamorphosis is a biological process whereby a living organism physically changes its form or structure during development. Perhaps the most notable form of metamorphosis is the transformation from the immature insect into the adult form. Another form of metamorphosis is observed in chameleons, which are famous for their ability to change their skin color to blend in with their surroundings.

Furthermore, there are living organisms called sequential hermaphrodites (or dichogamy) which are organisms born as one sex and which then later change into the other sex. A few species in this group can change gender multiple times, but they can only function as one sex at a time. Unlike humans, the DNA of these species does not determine their gender, allowing full functional gender change without modifying the DNA.

It should be understood that emergence is not about complexity and simplicity, but is more about features that, being not present at a local level, appear at a global level, but whose uncontrolled appearance may result in greater levels of complexity.

Biologically-inspired computing adopts biological approaches to effective problem solving, where solutions developed by nature through millions of years of evolution are applied in the computing milieu.

Sterritt and Hinchey describe self-destruction in agent-based systems as a last resort situation to prevent further damage that can be due to race conditions or undesirable emergent behavior. In their approach, they propose an apoptosis "stay alive" construct used to confirm that if an agent is still within the correct context and behavior it should stay alive and not self-destruct. See, R. Sterritt and M. G. Hinchey, "Apoptosis and Self-Destruct: A Contribution to Autonomic Agents?", *Proc. FAABS-III, 3rd NASA/IEEE Workshop on Formal Approaches to Agent-Based Systems*, Greenbelt, Md., Springer Verlag (2005), which is incorporated herein in its entirety by reference.

Hartline describes a premature termination of a mobile agent from a malicious host in order to facilitate security measures. See, J. Hartline, Mobile Agents: A Survey of Fault Tolerance and Security, University of Washington, (1998), which is incorporated herein in its entirety by reference.

Chapelle et al. propose an architecture of cooperative agents where, due to a satisfaction model and local signals, agents learn to select behaviors that are well adapted to their neighbor's activities. See, J. Chapelle, O. Simonin, and J. Ferber, "How Situated Agents can Learn to Cooperate by Monitoring their Neighbors' Satisfaction", In *Proc. of the 15th European Conference on Artificial Intelligence*, 2002, pp. 68-72, which is incorporated herein in its entirety by reference.

Research into the self-sacrifice behavior of living species is currently being conducted at University of Cambridge, where researchers have developed a computer defense system that mimics how bees sacrifice themselves for the greater good of the hive. In this approach, "suicide nodes" defend networks from within. The idea is to give all the devices on a network, or nodes, the ability to destroy themselves, and take down any nearby malevolent devices with them. The self-sacrifice provision provides a defense against malicious nodes attacking clean nodes. The technique, called "suicide revocation," allows a single node to decide if a nearby node's behavior is malevolent, and if so, to shut it down, but at the cost of deactivating itself.

SUMMARY

According to various embodiments of the present teachings, an autonomic system is provided that comprises a plurality of autonomic components, for example, a coordinating autonomic component, a messenger autonomic component, and a plurality of autonomic worker components. Each autonomic component of the plurality of autonomic components can be individually programmed to (i) generate signals indicative of one or more triggering events, (ii) send the signals to one or more of the other autonomic components, and (iii) self-sacrifice voluntarily based on the occurrence of a triggering event. In an exemplary embodiment, the plurality of autonomic components can comprise a coordinating autonomic component that is programmed to assign programmed tasks and issue instructions to each of a plurality of autonomic worker components. In some embodiments, the system can comprise a messenger autonomic component that is configured to facilitate communication between a coordinating autonomic component and one or more autonomic worker components. Each of the autonomic worker components can comprises one or more scientific instruments and can be configured to operate the respective one or more scientific instruments. At least one of the autonomic components of the system can be configured to self-sacrifice voluntarily by transformation or self-destruction upon occurrence of a triggering event.

In some embodiments, the triggering event that can lead to self-sacrifice can comprise one or more of: an incorrect operation; a determination of likelihood of jeopardizing a primary objective; a failure to perform a self-configuration operation; a failure to perform a self-healing operation; a failure to perform a self-optimizing operation; a failure to perform a self-protecting operation, and the like. The self-sacrifice can comprise a transformation operation, for example, a transformation of an autonomic component to a shield unit. In some embodiments, self-sacrifice can comprise a transformation to a different type of autonomic components, for example, from an autonomic worker component to a messenger autonomic component, or a transformation from an autonomic worker component to a coordinating autonomic component. Self-sacrifice can occur by other means as well, for example, self-sacrifice can comprise shutting down or turning off a scientific instrument.

In some embodiments, the autonomic system can comprise one or more deep sea exploration vehicles or space exploration vehicles, for example, a plurality of different vehicles. Each vehicle can have one or more scientific instrument on-board and redundancies can be built into the system such that two or more of the vehicles can have the same type of instrument on-board. For example, at least one of the autonomic components can comprise a magnetometer, at least one of the autonomic worker components can comprise an X-ray analyzer, and at least one of the autonomic worker components can comprise an infrared analyzer.

According to various embodiments of the present teachings, a method for managing an autonomic system is provided. The autonomic system can comprise a plurality of autonomic components and the method can comprise generating a signal indicative of a triggering event pertaining to one or more faulty autonomic components of a plurality of autonomic components. The method can also comprise causing each of the one or more faulty autonomic components to undertake a voluntary self-sacrifice operation comprising at least one of a transformation operation and a self-destruction operation. In some embodiments, the self-sacrifice can entail transforming to a shield unit, transforming to a messenger autonomic component, transforming to a coordinating autonomic component, or shutting down or turning off a scientific instrument. The one or more faulty autonomic components can comprise a plurality of faulty autonomic components or just a single faulty autonomic component.

The autonomic components of the system can comprise, for example, space exploration vehicles or deep sea exploration vehicles. One or more autonomic components of the system can individually comprise one or more magnetometers, X-ray analyzers, infrared analyzers, mass spectrometers, photodiode-containing detectors, combinations thereof, and the like. The method can comprise undertaking a self-sacrifice operation upon a triggering event such as: an incorrect operation; a determination of likelihood of jeopardizing a primary objective; a failure to perform a self-configuration operation; a failure to perform a self-healing operation; a failure to perform a self-optimizing operation; and a failure to perform a self-protecting operation.

BRIEF DESCRIPTION OF THE DRAWINGS

The present teachings will be described with reference to the accompanying drawings. The drawings are intended to illustrate, not limit, the present teachings.

FIG. 3 depicts a partial specification of a self-sacrifice policy according to various embodiments of the present teachings.

DETAILED DESCRIPTION OF THE PRESENT INVENTION

According to various embodiments, a number of initiatives inspired by concepts from biology have arisen for self-management of a complex system. Biological systems, and in particular, the Autonomic Nervous System (ANS), are capable of performing autonomic, innate or in-built, self-regulation activities requiring no conscious thought. In similar fashion, and according to various embodiments of the present teachings, a software system is provided that manages itself. In some embodiments, the system takes advantage of emergent behavior similar to that in social insect colonies. It has been found that emergent behavior helps an insect colony to collectively solve complex problems without centralized control. Thus, colony (or swarm) behavior appears out of local interactions between individuals with simple rule sets and no global knowledge. In fact, emergent behavior does not "help" insect colonies in the general sense of the word, but instead it is the coordinated behavior of the social insects that collectively solves problems. What is emergent in this example is coherence and cooperation from a global point of view, where at the level of the individual nothing actively pushes for it.

According to various embodiments, the self-sacrifice behavior of one or more individual components can be absorbed in serving the usefulness or lives of other individual components. Thus, an emergent behavior is provided wherein the individual components sacrifice themselves to jointly solve a complex problem vital to the entire system or swarm. In some embodiments an emergent behavior can be provided by the system whereby one or more components of the system self-sacrifices itself for the greater good of the system. In an example, each component can be programmed to identify at least one condition that would cause the respective component to be detrimental to the greater good of the system. The component could also be programmed to self-sacrifice itself if the condition is determined to exist, thereby benefiting the entire system. As an illustration, such a time-to-self-sacrifice condition can comprise exceeding a risk threshold, for example, a threshold determined by a risk analysis program that is run periodically during operation of the system component. For example, if the continued operation of the component poses a risk of collision with another component of the system, and the risk exceeds a risk threshold, a self-sacrifice operation can be initiated for the greater good of the entire system. Self-sacrifice can comprise, for example, shutting down, self-destruction, or the like. Self-destruction can be, for example, by explosion, by implosion, or be steering into an asteroid, planet, or sun, in the case of a multiple spacecraft system.

According to various embodiments of the present teachings, an autonomic nano technology swarm (ANTS) system is provided. With the ANTS system, a swarm of small autonomous exploration vehicles, such as spacecraft, can be used for an exploration mission, thus reducing the costs and risks involved when only a single, larger spacecraft is used. The system further enables exploration missions where a single, large, spacecraft would be impractical, and can offer greater redundancy and increased mission longevity in harsh environments. The ANTS system can exhibit all of the features of a multi-agent autonomous system (AS) wherein the spacecraft, vehicles, or system components themselves are autonomic elements (AEs).

According to various embodiments, the software architecture is adaptive in all its attributes and functionality, including its performance, security, fault tolerance, configurability, and the like. Moreover, the system can make decisions to cope with new environmental conditions encountered, and can learn and evolve to become better adapted to what it is supposed to do. Thus, a spacecraft unit can be programmed such that its own self-sacrifice can be used to protect other components or units vital to the system, or programmed to self-sacrifice if the result would be a significant performance gain for the entire system or mission.

In some embodiments, the emergent behavior is a complex behavior derived spontaneously from simple rules. Thus, the emergent behavior can enable the production of a high-level, more complex behavior through the interaction of multiple system components, by following simple rules.

The self-sacrifice behavior described herein differs from the other approaches mentioned above in at least the following ways. Firstly, in some embodiments, "death" is not always assumed for the individual component. Secondly, in some embodiments, self-sacrifice can comprise making a choice of leaving a critical task to another individual component when the individual's own performance is not optimal. These and other advantages are apparent from the present teachings.

According to various embodiments, an autonomic element in a system comprising numerous autonomic elements can exhibit or be programmed to exhibit self-adapting behavior to improve performance and/or to protect vital parts of the system. According to some embodiments, an autonomic element can comprise a spacecraft in an autonomous space mission. According to some embodiments, the spacecraft can comprise an autonomous worker vehicle or component in an autonomous space mission which mission involves using a plurality of different spacecrafts. According to some embodiments, the autonomic space mission can be performed by an ANTS system as described above. According to some embodiments, each spacecraft in the ANTS system can have a specialized mission. According to some embodiments, individual components, such as spacecraft or units in the ANTS system, can be programmed to exhibit emergent self-adapting behavior. An individual spacecraft unit of the system can perform self-sacrifice as part of its self-adapting behavior, in order to improve the system performance and/or to protect vital parts of the system, for example, based on goals of an exploration mission.

According to various embodiments, the system uses Autonomic System Specification Language (ASSL). The ASSL can be used to model the self-sacrifice behavior of the individual spacecraft units. The ASSL can follow simple pre-defined rules, but can help in the formation of an emergent complex system-level behavior that strives to protect and optimize the system as a whole. It should be understood that by self-sacrifice, "death" is not the only option under consideration for the spacecraft, but rather, in some embodiments another option for self-sacrifice can comprise a voluntary relinquishment from the "social status" of the spacecraft in the swarm. According to some embodiments, the voluntary relinquishment from the "social status" can be achieved by delegating rights from one component to another, for example, from one spacecraft to another spacecraft of the system.

The systems, clients, servers, methods, computer-readable media, software, hardware, and operating environments that can be used include those described in U.S. Patent Applications Publications Nos. US 2007/0073631 A1, entitled "Systems, Methods and Apparatus for Quiescence of Autonomic Systems," and US 2007/0260570 A1, entitled "Systems, Methods and Apparatus for Autonomic Safety Devices," which are incorporated herein in their entireties, by reference.

ANTS Structure

According to various embodiments of the present teachings, an ANTS system is provided for use in a sub-mission Prospecting Asteroids Mission (PAM). The PAM can provide a novel approach to asteroid belt resource exploration. ANTS can provide extremely high autonomy, minimal communication requirements to Earth, and a set of very small explorers with few consumables. In some embodiments, the explorers forming the swarm can be pico-class, low-power, and low-weight spacecraft units, yet capable of operating as fully autonomous and adaptable agents.

Figure 1:
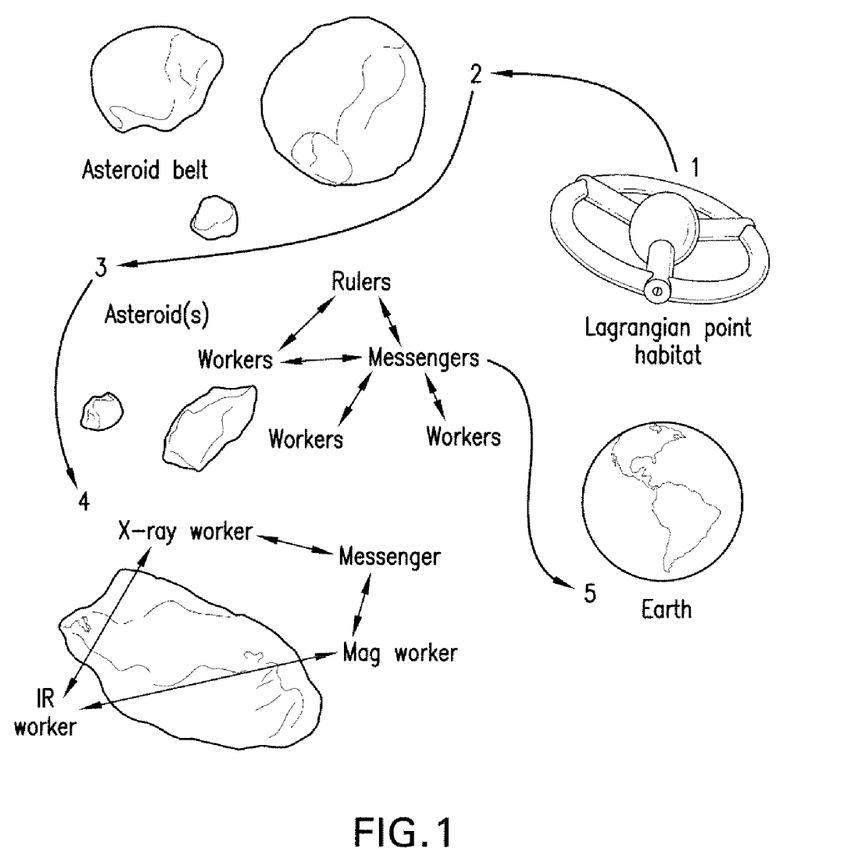
FIG. 1 is a diagram depicting the ANTS concept mission scenario according to various embodiments of the present teachings.

FIG. 1 depicts a PAM sub-mission scenario of the ANTS concept mission, according to various embodiments of the present teachings. As depicted in FIG. 1, a transport spacecraft launched from Earth toward an asteroid belt can carry a laboratory that assembles tiny spacecraft. Once the transport spacecraft reaches a certain point in space where gravitational forces are balanced, termed a Lagrangian, and in this case the L1 Lagrangian point, the transport ship can release the assembled swarm, which can head toward the asteroid belt. Each spacecraft can be equipped with a solar sail and thereby can rely primarily on power from the sun, using, for example, tiny thrusters to navigate independently.

As FIG. 1 shows, there can be at least three classes of spacecraft: coordinating autonomic components (rulers); messenger autonomic components (messengers); and autonomic worker components (workers). By grouping them in appropriate ways, the ANTS system can form teams that explore particular asteroids of the asteroid belt. Hence, the ANTS system can exhibit self-organization since there is no external force directing its behavior and no single spacecraft having a global view of the intended macroscopic behavior. According to some embodiments, the internal organization of the swarm can depend on the global task to be performed and on the current environmental conditions. According to some embodiments, the swarm can consist of several sub-swarms, which can be temporal groups organized to perform a particular task. According to some embodiments, each sub-swarm can have a coordinating group leader (ruler), one or more messengers, and a number of workers each carrying at least one specialized instrument. According to some embodiments, the messengers can connect or provide communications between the team members when such team members cannot connect directly to one another.

Self-Sacrifice Scenarios in ANTS

According to various embodiments, the system can implement self-optimization. In general, the global system optimization can be correlated to the optimization of the individual system elements. Each component of the system can improve its performance on-the-fly. For example, in some embodiments rulers can use experience gained to self-optimize. As an example, rulers can use their experience to improve their ability to identify asteroids. In some embodiments, messengers can strive to find the best position to improve communication among the other components or swarm units. According to some embodiments, workers can self-optimize through learning and experience.

Single components can "die" for the good of the entire system or otherwise self-sacrifice, for example, by voluntarily relinquishing their posts. In some embodiments, a spacecraft unit can, for example, voluntarily relinquish its post as an ANTS worker component by delegating tasks to other worker components. While scenarios related to self-sacrifice of ANTS workers are described in great detail herein, it is to be understood that other classes of spacecraft, for example, rulers and/or messengers, can also be configured to self-sacrifice voluntarily.

According to various embodiments, a worker can "die" or sacrifice itself voluntarily. For example, a worker can sacrifice itself voluntarily when the worker cannot continue performing its duties as a worker. As an illustration, a worker can self-sacrifice if it cannot continue to support the service-level objectives assigned to it (for example, if it cannot achieve performance). While operating in space, for example, an instrument of a worker can be damaged but not destroyed. For example, the instrument may still be operational, but its performance might be degraded or destroyed. According to some embodiments, a worker with a destroyed or heavily damaged instrument that performs below a performance minimum, can self-sacrifice voluntarily.

According to some embodiments, the self-sacrifice can comprise a transformation, for example, a transformation of a worker. If a worker cannot perform its duties anymore, due to a damage or instrument loss, the worker can, according to various embodiments, perform one or more operations. The operations can comprise, for example, asking the ruler to assign a new replacement worker, and/or striving to transform into another category of component useful to the swarm unit. Such transformation can comprise, for example, transforming from a worker to a messenger, from a messenger to a worker, from a worker to a ruler, or the like. According to some embodiments, a worker can try to transform to a ruler or a messenger, but if it is not possible for the worker to transform to a ruler or messenger, the worker can instead transform to a shield component such as a stand-by shield. According to some embodiments, such a shield component can sail nearby and strive to protect the replacement worker from different hazards. For example, a shield unit can, according to some embodiments, take the impact of an incoming small asteroid which is about to hit the replacement worker. The shield unit does not have to spend additional time and resources to recover from this probable impact. This kind of protection can comprise a complete self-sacrifice because the shield unit can serve as such until its full destruction, while increasing the overall performance of the system.

According to various embodiments, the self-sacrifice operation can comprise a self-destruction operation. According to some embodiments, when a worker is damaged so badly that it cannot move anymore, the worker can self-destruct, for example, by exploding. This can be used to avoid the risk of collision with another component of the system. Hence, there can be a real self-sacrifice that indirectly leads to higher system performance, due to the reduction in the risk of an impact.

According to various embodiments, the self-sacrifice behavior of a single component, such as a spacecraft unit in an ANTS system, can be modeled with Autonomic System Specification Language (ASSL). With ASSL, validation and code generation of the specified as can be achieved. According to various embodiments, the ASSL can be defined through formalization tiers. According to some embodiments, over the formalization tiers, ASSL can provide a multi-tier specification model that is designed to be scalable and to expose a judicious selection and configuration of infrastructure elements and mechanisms needed by an AS. ASSL can define an AS with interaction protocols and AEs, where the ASSL tiers and their sub-tiers describe different aspects of the AS under consideration, like policies, communication interfaces, execution semantics, actions, and the like.

Figure 2:
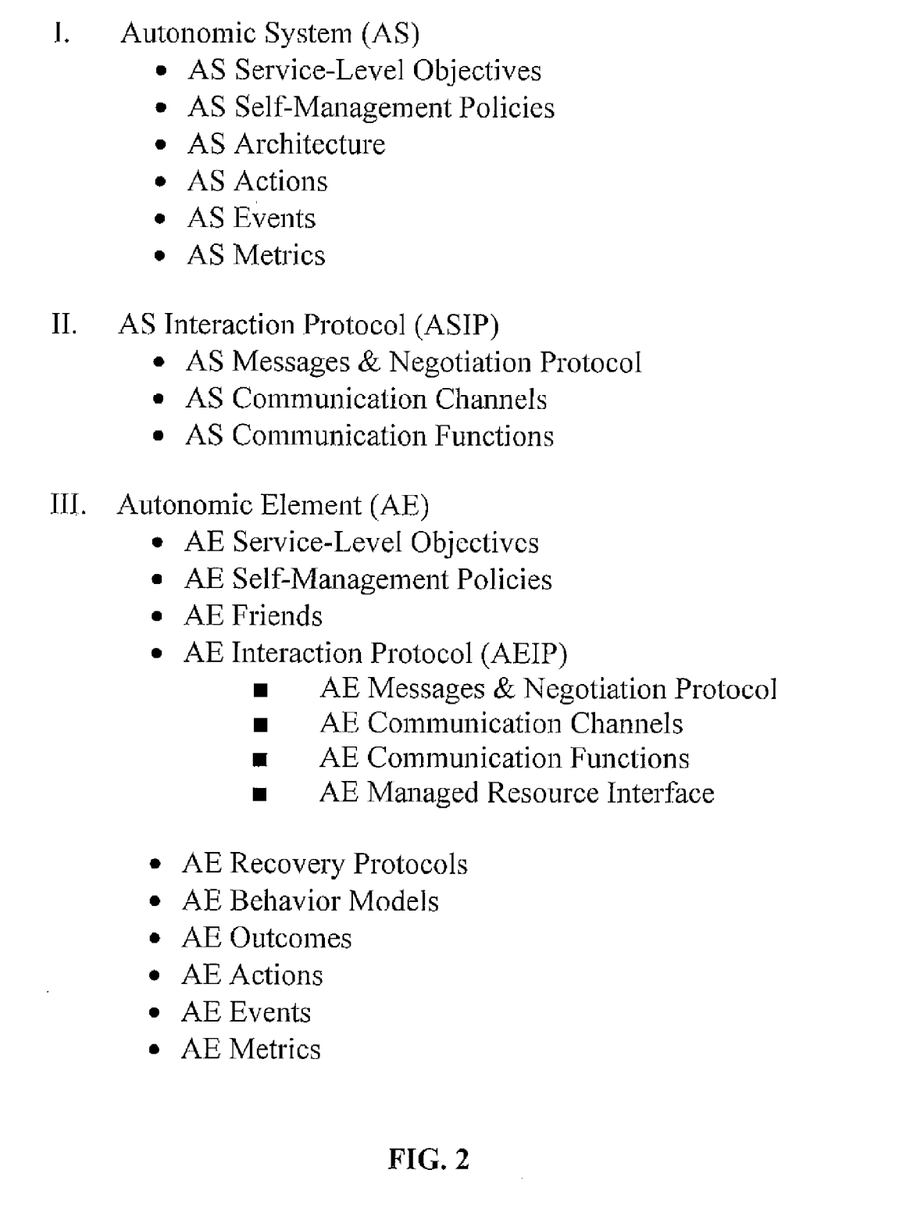
FIG. 2 depicts the multi-tier specification model of Autonomic System Specification Language (ASSL) according to various embodiments of the present teachings.

According to various embodiments, the ASSL tiers and their sub-tiers, as shown in FIG. 2, can be abstractions of different aspects of the autonomic system under consideration. According to some embodiments, the AS Tier can specify an AS in terms of service-level objectives (AS SLO), self-management policies, architecture topology, actions, events, and metrics. According to some embodiments, the AS SLO can be a high-level form of behavioral specification that establishes system objectives such as performance. According to some embodiments, the self-management policies of an AS can include: 1) self-configuring; 2) self-healing; 3) self-optimizing; and 4) self-protecting (also referred to herein as a self-CHOP of an AS). Other self-management policies can also or instead be included. According to some embodiments, the metrics can constitute a set of parameters and observables controllable by the AEs.

According to various embodiments, at the AS Interaction Protocol tier, the ASSL framework can specify an AS-level interaction protocol (ASIP). According to some embodiments, ASIP can be a public communication interface, expressed as communication channels, communication functions, and messages.

According to various embodiments, at the AE Tier, the ASSL formal model considers AEs to be analogous to software agents able to manage their own behavior and their relationships with other AEs. According to some embodiments, at the AE Tier, ASSL can describe the individual AEs.

According to various embodiments, a worker's self-sacrifice behavior can be modeled with ASSL. It should be understood that the model presented and described herein is exemplary only.

According to various embodiments, the self-sacrifice behavior can comprise a self-management policy, which can be specified at the individual component or spacecraft level (at the AE Tier). FIG. 2 presents a partial specification of a self-sacrifice policy that can be used according to various embodiments based on the scenarios described herein. FIG. 2 describes possible choices a worker can make when the worker is no longer minimally or fully operational. According to various embodiments, the definitions that follow can be used to specify exemplary the self-sacrifice policies.

Self-sacrifice can be defined as a self-management policy structure. A set of fluents and mappings can be used to specify this policy. With fluents, specific situations can be expressed, in which the policy is interested. With mappings, the situations can be mapped to actions.

Actions can be defined as a set of actions that can be undertaken by the worker in response to certain conditions, and according to that policy, as shown in FIG. 3.

Events can be defined as a set of events that initiate fluents and can optionally be prompted by actions according to that policy.

Metrics can be defined as a set of metrics needed by that policy.

According to various embodiments, the unableToExplore fluent, shown in FIG. 2, can take place when the worker is no longer operational, due to, for example, heavy damage or instrument loss. The fluent can be initiated by an instrIsNonfunctional event and can terminate if one of the events canBeRuler, canBeMessenger, canBeShield, or mustBeDestroyed occurs. In some embodiments, this fluent can be mapped to a checkTransformation action that checks for a possible worker transformation and triggers one of the triggering events that terminate the current fluent. According to some embodiments, each of the terminating events can initiate a new fluent respectively. According to some embodiments, the "transform" fluents, shown in FIG. 2, can be mapped to "transformTo" actions, exemplary portions of which are presented in FIG. 3. The mapping can transform the worker into a ruler, a messenger, or a shield, according to the example shown. As specified, the transformation attempts can be hierarchically related. Thus, when possible, the transformation process can start with a transformation into a ruler or into a messenger, and then, in case of failure, the algorithm can attempt to perform a transformation into a shield. According to some embodiments, at the end of the hierarchically ordered transformations, self-destruction of the worker can be performed, in case none of the transformations is successful. A self-destruction device can be included in or on the component, for example, an explosive charge and appropriate detonation circuitry mounted in a spacecraft.

According to various embodiments, ASSL can allow specification of systems evolving over time. According to some embodiments, the evolution of such systems can take place in the actions of the system. According to some embodiments, via a finite set of change, remove, add, and create statements, the actions of the system can prompt changes in the tiers and sub-tiers of the AS under consideration.

Figure 4:
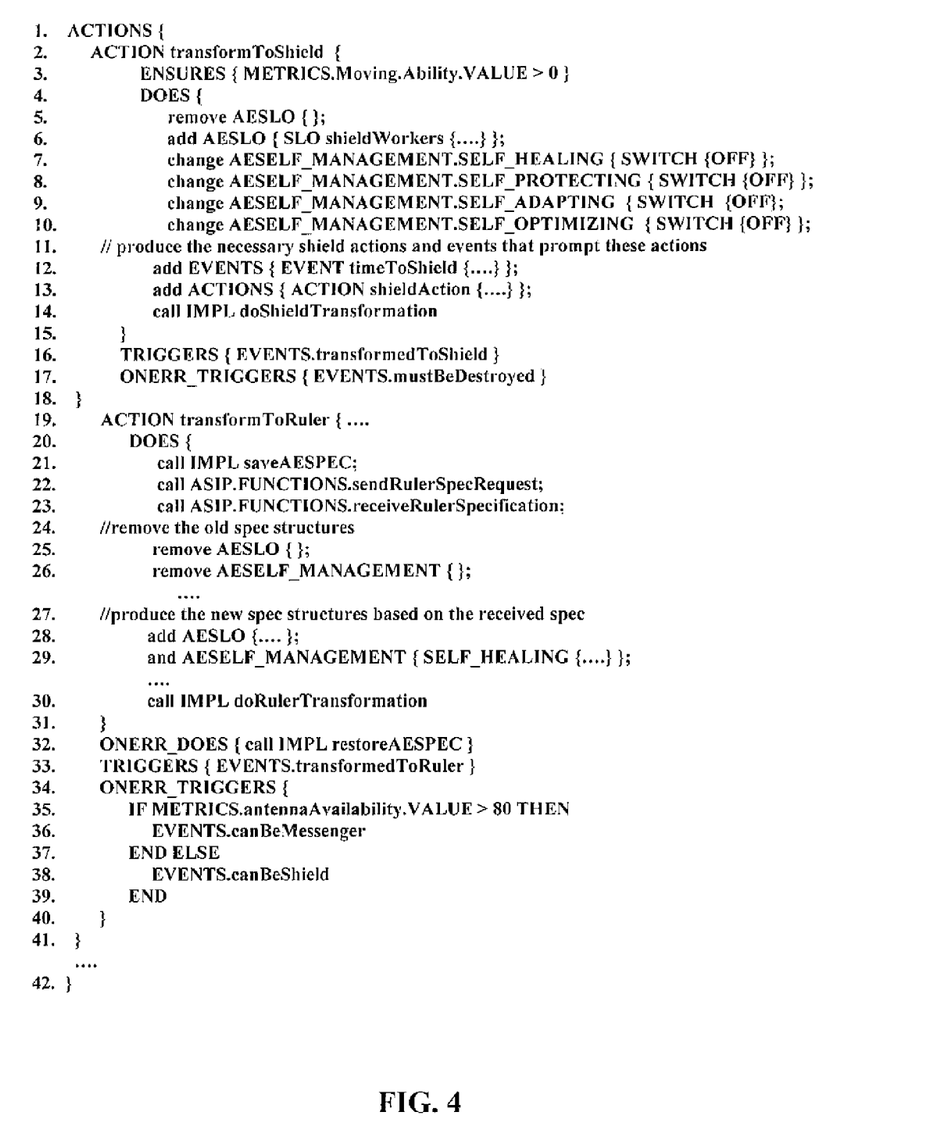
FIG. 4 depicts a partial specification of exemplary actions included in a self-sacrifice policy according to various embodiments of the present teachings.

FIG. 4 presents a partial specification of some of the actions which can be needed by the self-sacrifice policy. It should be understood that, the "transformTo" actions can change the service-level objectives (SLO) of the worker under consideration. According to some embodiments, these actions can be used to re-specify the component or unit in accordance with the new SLO. According to some embodiments, the transformToShield action can first remove the old worker SLO specifications and next create the new shield SLO, as shown in FIG. 3, thus avoiding contradictions between both worker and shield SLO. It should be understood that while the add statements in FIG. 3 are only partially their use in a more complex algorithm would be apparent to those skilled in the art given the present teachings.

According to some embodiments, the transformToShield action can turn off the other worker's self-management policies to avoid contradictions between both worker and shield SLO. According to some embodiments, the transformToShield action can turn off the other worker's self-management policies via four change statements, which set the SWITCH flag of the self-management policies to OFF.

In some embodiments, the physical transformation can be accomplished by the IMPL routine doShieldTransformation. The IMPL clause states "for further implementation". This means that the ASSL framework will generate doShieldTransformation as an empty routine for manual implementation.

While spacecraft have been exemplified herein as the system components, it is to be understood that other systems and components are also within the scope and spirit of the present teachings. Systems comprising deep sea exploration components or other exploration vehicles should also be considered to be within the realm of the present teachings.

Other embodiments of the present invention will be apparent to those skilled in the art from consideration of the present specification and practice of the present invention disclosed herein. It is intended that the present specification and examples be considered as exemplary only with the true scope and spirit of the invention being indicated by the following claims and equivalents thereof.

What is claimed is:
1. An autonomic system comprising:
a plurality of autonomic components, comprising a coordinating autonomic component, a messenger autonomic component, and a plurality of autonomic worker components, each autonomic component of the plurality of autonomic components being programmed to (i) generate signals indicative of one or more triggering events, (ii) send the signals to the coordinating autonomic component, and (iii) decide to change function within the autonomic system based on the occurrence of at least one of the one or more triggering conditions,
wherein the coordinating autonomic component is programmed to assign programmed tasks and issue instructions to each of the plurality of autonomic worker components, the messenger autonomic component is configured to facilitate communication between the coordinating autonomic component and the plurality of autonomic worker components, each of the autonomic worker components comprises a scientific instrument and is configured to operate the respective scientific instrument, and following at least one or more triggering condition, at least one of the autonomic components of the plurality of autonomic components changes function, where function includes switching off all power and/or operation on a temporary or more likely permanent basis, or relinquishing certain assets including but not limited to power or components or interfaces to other devices.

2. The autonomic system of claim 1, wherein the one or more triggering events comprise one or more of:
an incorrect operation; a determination of likelihood of jeopardizing a primary objective;
a failure to perform a self-configuration operation;
a failure to perform a self-healing operation;
a failure to perform a self-optimizing operation; and a failure to perform a self-protecting operation.

3. The autonomic system of claim 1, wherein at least one of the autonomic worker components is configured to change function by transformation to a shield unit.

4. The autonomic system of claim 1, wherein at least one of the autonomic worker components is configured to change function by transformation to a messenger autonomic component.

5. The system of claim 1, wherein at least one of the autonomic worker components is configured to change function by transformation to a coordinating autonomic component.

6. The system of claim 1, wherein at least one of the autonomic worker components is configured to change function by turning off a scientific instrument.

7. The autonomic system of claim 1, wherein the plurality of autonomic worker components comprises one or more space exploration vehicles.

8. The autonomic system of claim 1, wherein the plurality of autonomic worker components comprises one or more deep sea exploration vehicles.

9. The autonomic system of claim 1, wherein at least one of the autonomic worker components comprises a magnetometer, at least one of the autonomic worker components comprises an X-ray analyzer, and at least one of the autonomic worker components comprises an infrared analyzer.

10. A method for managing an autonomic system comprising a plurality of autonomic components, the method comprising:
generating a signal indicative of a triggering condition pertaining to at least one of the autonomic components of the plurality of autonomic components; and
causing each of the at least one or more autonomic components to decide to change function, where changing function comprises the autonomic component to transfer to another function within the autonomic system, where function includes switching off all power and/or operation on a temporary or more likely permanent basis, or relinquishing certain assets including but not limited to power or components or interfaces to other devices.

11. The method of claim 10, wherein changing function comprises transforming to a shield unit.

12. The method of claim 10, wherein changing function comprises transforming to a messenger autonomic component.

13. The method of claim 10, wherein changing function comprises transforming to a coordinating autonomic component.

14. The method of claim 10, wherein changing function comprises turning off a scientific instrument.

15. The method of claim 10, wherein the at least one of the autonomic components comprises a plurality of faulty autonomic components.

16. The method of claim 10, wherein the at least one of the autonomic components comprises a single faulty autonomic component.

17. The method of claim 10, wherein at least one autonomic component of the plurality of autonomic components comprises a space exploration vehicle.

18. The method of claim 10, wherein at least one of the autonomic components comprises a deep sea exploration vehicle.

19. The method of claim 10, wherein at least one of the autonomic components comprises a magnetometer, at least one of the autonomic components comprises an X-ray analyzer, and at least one of the autonomic components comprises an infrared analyzer.

20. The method of claim 10, wherein the triggering event comprises one or more of: an incorrect operation; a determination of likelihood of jeopardizing a primary objective; a failure to perform a self-configuration operation; a failure to perform a self-healing operation; a failure to perform a self-optimizing operation; and a failure to perform a self-protecting operation.

* * * * *